(12) United States Patent
Ekström

(10) Patent No.: US 12,472,558 B2
(45) Date of Patent: Nov. 18, 2025

(54) SUPPORT STRUCTURE

(71) Applicant: Siemens Energy Global GmbH & Co. KG, Bayern (DE)

(72) Inventor: Gustav Ekström, Kimstad (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 645 days.

(21) Appl. No.: 17/762,936

(22) PCT Filed: Sep. 7, 2020

(86) PCT No.: PCT/EP2020/074907
§ 371 (c)(1),
(2) Date: Mar. 23, 2022

(87) PCT Pub. No.: WO2021/063632
PCT Pub. Date: Apr. 8, 2021

(65) Prior Publication Data
US 2022/0355382 A1    Nov. 10, 2022

(30) Foreign Application Priority Data

Sep. 30, 2019  (EP) .................................... 19200371

(51) Int. Cl.
*B22F 10/47* (2021.01)
*B22F 10/40* (2021.01)
(Continued)

(52) U.S. Cl.
CPC .............. *B22F 10/47* (2021.01); *B22F 10/40* (2021.01); *B33Y 80/00* (2014.12); *B33Y 10/00* (2014.12)

(58) Field of Classification Search
CPC .......... B22F 10/47; B22F 10/40; B22F 10/00; B22F 2998/10; B22F 10/28; B22F 10/60;
(Continued)

(56) References Cited

U.S. PATENT DOCUMENTS

| 2018/0086004 A1* | 3/2018 | Van Espen ............ B29C 64/393 |
| 2020/0384694 A1 | 12/2020 | Ceriani |
| 2021/0016498 A1 | 1/2021 | Ovaere et al. |

FOREIGN PATENT DOCUMENTS

| CN | 1939703 A | 4/2007 |
| CN | 103511427 A | 1/2014 |

(Continued)

OTHER PUBLICATIONS

PCT International Search Report and Written Opinion of International Searching Authority mailed Dec. 22, 2020 corresponding to PCT International Application No. PCT/EP2020/074907 filed Jul. 9, 2020.

*Primary Examiner* — Rebecca Janssen
(74) *Attorney, Agent, or Firm* — Wolter Van Dyke Davis, PLLC

(57) ABSTRACT

A supported product manufactured using additive manufacturing, wherein the supported product provides a simplified post processing. The supported product contains a product and a support structure, wherein the supported product has been manufactured using additive manufacturing as a whole, wherein the support structure is adapted to be removed to provide the product, wherein the support structure provides an interface adapted to interact with a counterpart of a tool for removing the support structure.

12 Claims, 3 Drawing Sheets

(51) Int. Cl.
*B33Y 10/00* (2015.01)
*B33Y 80/00* (2015.01)

(58) Field of Classification Search
CPC .... B22F 2003/247; B22F 3/162; B33Y 80/00; B33Y 10/00; B33Y 40/00; B33Y 40/20; B33Y 30/00; Y02P 10/25; B29C 64/245; B29C 64/379; B29C 64/40
See application file for complete search history.

(56) References Cited

FOREIGN PATENT DOCUMENTS

| | | |
|---|---|---|
| CN | 203404206 U | 1/2014 |
| CN | 105682899 A | 6/2016 |
| CN | 107810072 A | 3/2018 |
| DE | 102015211414 A1 | 12/2016 |
| EP | 3511164 A1 | 7/2019 |
| WO | 2016161276 A1 | 10/2016 |
| WO | 2018210957 A1 | 11/2018 |
| WO | 2019180363 A1 | 9/2019 |

\* cited by examiner

SUPPORT STRUCTURE

CROSS REFERENCE TO RELATED APPLICATIONS

This application is the US National Stage of International Application No. PCT/EP2020/074907 filed 7 Sep. 2020, and claims the benefit thereof. The International Application claims the benefit of European Application No. EP19200371 filed 30 Sep. 2019. All of the applications are incorporated by reference herein in their entirety.

FIELD OF INVENTION

The present invention refers to a supported product manufactured using additive manufacturing, wherein the supported product provides a simplified post processing. Furthermore, the present invention refers to the method of manufacturing such supported product. Additionally, the present invention refers to a computer program product adapted to perform such method. Furthermore, the present invention refers to a device to provide such computer program product.

BACKGROUND OF INVENTION

Additive manufacturing is a very flexible method of manufacturing utilizing building up a product by adding material on an existing part or right from the scratch. In recent years the possibilities significantly improved and this new method of manufacturing products has been introduced into industrial processes. Especially, the possibility to build up structures utilizing geometries not possible using conventional methods of manufacturing significantly increases the benefit provided herewith. Methods like 3D printing, for example, utilize a metal or metal composition powder being melted layer by layer to manufacture a complex 3D structure. Despite the high flexibility provided with such method, certain requirements are still to be considered. For example, it can be necessary to support part of such product be printed to utilize methods like selective laser melting (SLM). Herein, such support may be provided by a structure also printed using such additive manufacturing method along with the real part and later be removed. Further process steps like grinding or milling steps can be utilized in this context to provide the final product. While such method steps are already known and available, it is still a topic to further optimize the process to enable further applications and decrease the costs associated with known processes.

These problems are solved by the products and methods as disclosed hereafter and in the claims. Further beneficial embodiments are disclosed in the dependent claims and the further description. These benefits can be used to adapt the corresponding solution to specific needs or to solve further problems.

SUMMARY OF INVENTION

According to one aspect the present invention refers to a supported product manufactured using additive manufacturing, preferably 3D printing, wherein the supported product contains a product and a support structure, wherein the supported product has been manufactured using additive manufacturing as a whole, wherein the support structure is adapted to be removed to provide the product, wherein the support structure provides an interface adapted to interact with a counterpart of a tool for removing the support structure.

Surprisingly, it was noted that utilizing such design allows to easily remove corresponding support structures significantly decreasing the effort required. Furthermore, it was noted that such design also allows to apply support structures at positions that are typically very difficult to post process. While normally some drilling procedure to remove conventional support structures would have to be precisely controlled to avoid damaging the intended product the inventive support structure allows to avoid any unnecessary damage with little to no effort required.

According to another aspect the present invention refers to a product manufactured by removing the support structure of the inventive supported product. While it is possible to remove all remains of the intermediate layer from the product it was noted that for many applications there is little to no effect of such remains and the product can be easily utilized without such additional process step. In such cases the product still provides remains of the intermediate layer during its usage.

According to another aspect the present invention refers to a method of manufacturing a product containing the steps of—manufacturing an inventive supported product using additive manufacturing, and—removing the support structure from the supported product using a tool.

According to another aspect the present invention refers to a use of the support structure for supporting a product during an additive manufacturing process, wherein the support structure is adapted to be removed to provide the product, wherein the support structure provides an interface adapted to interact with a counterpart of a tool for removing the support structure, wherein the support structure is manufactured along with the product during the additive manufacturing process.

According to another aspect the present invention refers to a computer program product with program commands to perform the inventive method.

According to another aspect the present invention refers to a device for providing an inventive computer program product, wherein the device stores the computer program product and/or provides the computer program product for further use.

To simplify understanding of the present invention it is referred to the detailed description hereafter and the figures attached as well as their description. Herein, the figures are to be understood being not limiting the scope of the present invention, but disclosing preferred embodiments explaining the invention further.

DETAILED DESCRIPTION OF INVENTION

Figure 1:
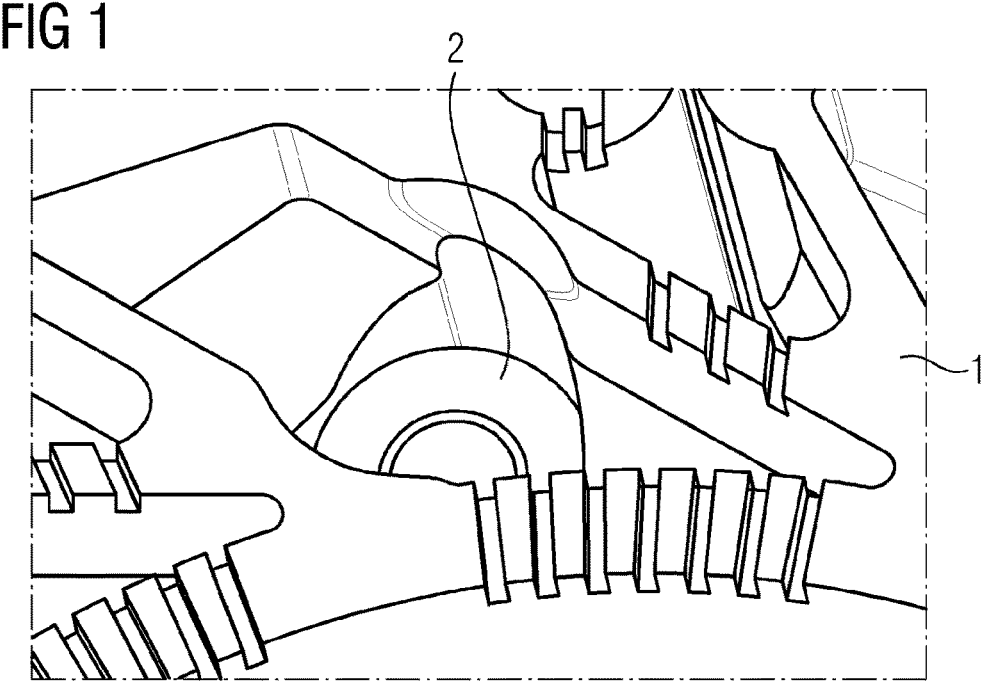
FIG. 1 shows a schematic cutout of a side view of the product, wherein the surface to be supported is shown in part.

According to one aspect the present invention refers to a supported product as specified above.

Surprisingly, it was noted that it is beneficial for typical embodiments to provide a defined layer adapted to function as breaking point of the support structure. According to further embodiments it is preferred that the product provides an intermediate layer connecting the remaining part of the support structure and the product. For typical embodiments it is further preferred that the intermediate layer provides a certain minimum thickness. For example, it can be preferred that the intermediate layer provides a thickness of at least 0.5 mm, more preferred at least 1 mm, even more preferred at least 3 mm. Surprisingly, this further improves the reliability of the simplification of breaking off the support structure. It is assumed that such thicker intermediate layer allows to avoid difficulties based on minor fluctuations during the manufacturing process resulting in locally stronger walls of the intermediate layer.

While the present invention can be applied to a multitude of different AM manufactured products it was noted that the benefits obtained herewith are especially high for products manufactured from metal or metal compositions. The term "metal composition" as used herein refers to compositions essentially consisting of metal. For example, it may consist of at least 70 wt.-% (weight-%), more preferred at least 80 wt.-%, even more preferred at least 90 wt.-%, of at least one metal. Further components can be, for example, semimetals and/or nonmetals. For example, the corresponding metal compositions may comprise metal oxide particles to influence the mechanical properties of the product. Also, it can, for example, comprise carbon to provide carbides.

It was further noted that the inventive design is especially beneficial for typical applications, wherein a metal product is to be provided. According to further embodiments it is preferred that the supported product essentially consists of metal or a metal composition. Typically, it is preferred that the supported product consists to at least 50 wt.-%, more preferred at least 80 wt.-%, even more preferred at least 95 wt.-%, of a metal or a metal composition.

Additive manufacturing methods are well established despite being relatively new. Especially additive manufacturing methods like 3D printing became topic for industrial applications in the past years and show a big potential to complement or replace existing conventional methods of manufacturing. The additive manufacturing methods are characterized by that a material is applied without some limiting element like some casting mold to build up the product. Examples of especially useful additive manufacturing methods are selective laser melting, electron beam melting and binder jetting. Such methods, for example, build up a product utilizing a powder possibly containing an additive like a binder that typically is removed in a later step like it is done for binder jetting. Very useful for the current application are 3D printing additive manufacturing methods like selective laser melting and electron beam melting building up the product from a powder, wherein the powder is melted layer by layer. By repeating this melting process for each layer of the product the 3-dimensional element is provided.

To provide such products a number of additive manufacturing methods have been established. Examples are selective laser melting (SLM) or electron beam melting (EBM). According to further embodiments it is preferred that the supported product has been manufactured using a metal powder or metal composition powder. Herein, corresponding manufacturing methods allow to easily realize the inventive support structures and simultaneously benefit greatly from the inventive design, as such support structures allow to realize new designs for industrial purposes based on the simplified post processing.

The generic design as described above can be realized for a multitude of products, wherein the simple design requirements as disclosed are to be kept in mind. According to further embodiments it is preferred that the intermediate layer provides a mechanical stability being lower than the mechanical stability of the interface. Herein, it can be preferred that the interface is designed to maintain its integrity when applying twice the amount of mechanical force than required to break the intermediate layer. To further increase the security especially for the operating person it is even preferred that the interface is adapted to withstand 4 times, even more preferred 10 times, the amount of mechanical force than being required to break the intermediate layer.

To provide the intermediate layer different kinds of structures can be utilized. According to further embodiments, it is preferred that the intermediate layer provides a multitude of wall-like and/or pin-like structures extending from the product to the remaining part of the support structure. For typical applications, it was noted that it is especially beneficial to include a multitude of wall-like structures in the intermediate layer. Herein, these wall-like structures can be arranged to provide cavities that may still be filled with, for example, metal powder or metal composition powder utilized during the additive manufacturing process. A type of structure that might be utilized in this context is known under the trademark Magics™ from the company Materialise NV of Leuven, Belgium. A Magics™ structure is formed using the Materialise Magics 3D data and build preparation software from Materialise NV of Leuven, Belgium. Utilizing such structures at this location provides the possibility to easily tailor the properties of the intermediate layer based on the requirements.

Surprisingly, it was noted that the designer providing the design for the supported product does not have to care much about powder material like metal powder being enclosed inside the intermediate layer. According to further embodiments it is preferred that the intermediate layer contains cavities filled with powder utilized during the manufacturing of the supported product. It was noted that correspondingly filled cavities provide a minimum effect on the process of breaking off the support structure. Thereafter, the power can be simply removed. Simultaneously, designing the supported product without corresponding requirements and openings allows to significantly reduce the amount of effort required. Furthermore, labor-intensive cleaning processes to remove the powder through small openings cease to exist for this element.

To provide an especially useful intermediate layer for typical application cases it was noted that selecting the intermediate layer to provide a predefined density is very effective. According to further embodiments it is preferred that the intermediate layer provides a lower density than the interface. Typically, it is preferred that the density of the intermediate layer of the support structure is at most 80%, more preferred at most 50%, even more preferred at most 30%, of the density of the interface of the support structure, wherein powder from the additive manufacturing process enclosed in cavities is disregarded. Designing the intermediate layer accordingly to this very simple design requirement already provides very useful results. In case the support structure provides multiple interfaces, the percentages are based on the density of the weaker interface.

Additionally, it was noted that the intermediate layer can be further optimized by including some segmentation. According to further embodiments of the present invention the intermediate layer is segmented. In such embodiments the intermediate layer is split into different segments that are typically evenly distributed within the area of the product facing the intermediate layer and the remaining part of the support structure. This allows to further optimize the breaking behavior of the intermediate layer in a very simple fashion. The designer providing the manufacturing data utilizing such methods can, for example, utilize a generic type of structure for the intermediate layer and further tailor the force required to break it off by including brackets between certain areas of the intermediate layer to reduce the force required as desired.

Furthermore, it was noted that simple design features included in the interface provides very useful results. According to further embodiments it is preferred that the interface provides an indentation and/or an outer shape adapted to interact with a counterpart of the tool for removing the support structure. For example, such indentation can be an angular indentation adapted to receive a hex key. For example, such outer shape can be at least two parallel sides adapted to be fitting into a wrench. For example, such indentation can be a linear indentation located on the outer surface of the support structure being adapted to receive a screwdriver. Surprisingly, it was noticed that utilizing the possibilities of the flexible additive manufacturing, especially 3D printing, allows to provide tailored interfaces enabling the utilization of, for example, commonly available tools to remove the support structure.

An example of an especially useful embodiment according to the present invention utilizes such simple design of the interface. According to further embodiments it is preferred that the interface provides an indentation, preferably a counterpart for a hex key, adapted to enable a removal of the support structure by a rotational movement of the tool.

Surprisingly, it was noted that especially support structures designed to be removed by such rotational movement not limited to interfaces utilizing an indentation, but also utilizing, for example, a specific outer shape of the support structure, are especially useful to allow an easy and safe removal of the support structure. According to further embodiments it is preferred that the support structure is adapted to be removed by applying a rotational force on the support structure utilizing the tool. Herein, utilizing some indentation was surprisingly especially useful. The corresponding support structure can be designed with minimum space requirements and provides a very high reliability.

For certain applications it was further noted that it is beneficial to provide a multitude of interfaces. According to further embodiments it is preferred that the support structure provides at least two interfaces adapted to utilize different tools for removing the support structure. Surprisingly, it was noted that such embodiment provided many practical benefits for certain applications. Especially, it was noted that in case of minor deviations or partial clocking of some indentation it is possible to simply switch to the other interface to remove the support structure. For example, the inventive support structure can be provided with one indentation allowing to remove the support structure utilizing some hex key and additionally some indentation allowing to remove the support structure using a screwdriver.

Depending on the further planned process steps it can also be beneficial to provide markers or information at the end of the interface of the support structure. According to further embodiments, the end of the support structure providing the interface further provides at least one reference sign and/or at least one information. This allows to provide some help being beneficial or required during the later steps. Herein it might not refer to the removal of the support structure. For example, a reference sign can be included indicating the position of the support structure for some automatic device controlling some robot arm to remove the support structure. For example, the information might be some arrow indicating a certain direction to rotate the support structure to more easily break off set support structure based on a specifically designed intermediate layer. For example, the information can be some indicator proving that this part was not utilized to this point like some marking being clearly visible to the operator with the naked eye. Such possibility to include some easy available proof that said part has not been utilized to this point and can be trusted with regards to its properties may easily prevent failures on the one hand or frauds on the other hand. For example, attaching some replacement support structure providing such design is highly difficult, as some corresponding structure still has to be easily removable comparable to the original one. For example, such information that can be included can be the amount of force required to remove the support structure. Herein, a number followed by "Nm" can inform the technician responsible how much force he has to apply utilizing a tool to remove the support structure. Providing the defined range combined with some automated removal tool can also be utilized as protection against selling refurbished parts as new parts. Herein, a comparison of the predefined specific required amount of force with the required force to remove the support structure can easily distinguish the original part from some parts, wherein some replacement support structure has been attached without such intermediate layer providing an exactly defined attachment.

According to further aspect the present invention refers to a product manufactured by removing the support structure of the inventive supported product. While it is possible to remove all remains of the intermediate layer from the product it was noted that for typical applications using a correspondingly selected design of the intermediate layer the amount of the intermediate layer remains is very low. Thus, the product can be easily utilized without such additional process step. In such cases the product still provides remains of the intermediate layer during its usage.

According to further aspect the present invention refers to a method of manufacturing a product containing the steps of—manufacturing an inventive supported product using additive manufacturing, and—removing the support structure from the supported product using a tool.

Powder enclosed in the intermediate layer surprisingly is less problematic for the manufacturing process and the later utilization of the product. However, it was noted that beneficially it should be evaluated, whether such powder is enclosed in the remains of the intermediate layer still available in the final product. According to further embodiments the former intermediate layer is inspected for cavities containing powder material from the additive manufacturing process after removal of the support structure, and wherein eventually remaining powder from such cavities is removed. Such inspection can easily be optimized to be included in some quality check step. However, by choosing the correct design of the intermediate layer such inspection can further be simplified by, for example, inspecting the removed support structure. For example, the intermediate layer may consist of the multitude of elongated cavities extending between the remaining part of the support structure and the product. This allows to evaluate whether all cavities have been opened by checking the removed support structure.

Furthermore, it was noted that it is beneficial to design the interface and intermediate layer to provide a stability enabling post processing steps like grinding or polishing the surface without damaging the interface of the support structure. This was surprisingly beneficial, as support structures breaking off during such step easily resulted in damages of the tool utilized for, for example, polishing or at least forced interruptions of such polishing process. According to further embodiments it is preferred that the interface and/or immediate layer are selected to allow a post processing step like polishing or grinding. Enabling such post processing step before removing the support structures is surprisingly beneficial for typical applications. For example, providing the metallic homogeneous surface allows to far more easily detect the interfaces based on their geometric features. This simplifies the work of some technician removing the support structures manually. However, it also simplifies the procedure of some robot arm removing such support structures automatically.

Surprisingly, the inventive solution provides a very simple way to easily adapt available designs of products for additive manufacturing processes like 3D printing. Herein, the inventive support structures can be easily included by the person skilled in the art based on the disclosure as contained herein during the preparation of the manufacturing data. According to further embodiments it is preferred that the method contains the step of providing the manufacturing data of the product by including the support structure in the manufacturing data. This allows to utilize existing workflows to easily adapt arbitrarily designs to the requirements of additive manufacturing, especially 3D printing.

According to a further aspect the present invention refers to a use of the support structure for supporting a product during an additive manufacturing process, wherein the support structure is adapted to be removed to provide the product, wherein the support structure provides an interface adapted to interact with a counterpart of a tool for removing the support structure, wherein the support structure is manufactured along with the product during the additive manufacturing process.

According to a further aspect the present invention refers to a computer program product preferably tangibly embodied in a machine-readable storage medium, including instructions operable to cause a computing entity to execute an inventive method.

Furthermore, it was noted that the inventive computer program product can be specifically adapted to easily provide manufacturing data that might utilized in especially 3D printing devices. According to further embodiments it is preferred that the computer program product provides suggestions for inventive support structures to be included in the manufacturing data. This allows to easily provide the manufacturing data required to realize the desired product utilizing, for example, a 3D printer.

According to further embodiments it is preferred that the computer program product allows to select support structures based on predefined forces entered, wherein said forces specify the amount of force required to remove the support structure. Surprisingly, it is possible to easily adjust the corresponding support structures and the corresponding intermediate layer based on standard structures for a broad variety of possible products.

Additionally, it was noted that it is beneficial to be able to further specify the removal process during the preparation of the manufacturing data. According to further embodiments it is preferred that the computer program product allows to specify the desired removal action and suggests corresponding support structures. For example, it can be specified whether the support structure should be removed by some rotational force or by some unidirectional force. This, for example, allows to adapt the corresponding support structures to available tools and automatic systems that might be utilized during such removal step.

Also, it was noted that it is beneficial for typical applications that the type of tool can be specified. According to further embodiments it is preferred that the computer program product allows to specify the desired type of tool to be used for removing the support structure. It was noted that this is especially useful to utilize existing automatic systems with a limited number of tools being available to be utilized for removing the support structures. Also, it can be preferred to utilize existing sets of, for example, hex key being high-quality instead of utilizing low-quality screw like tools for removal even in case the corresponding interfaces for the second type might be more beneficial for the specific embodiment. Surprisingly, it was further noted that typical end-users tend to prefer specific type of tools over the other resulting in some benefit which is not technically related, but resulting from the preferences of the corresponding technician.

According to a further aspect the present invention refers to a device for providing an inventive computer program product, wherein the device stores the computer program product and/or provides the computer program product for further use.

The present invention was only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

FIG. 1 shows a schematic cutout of a side view of the product 1, wherein the surface to be supported is shown in part. Not shown is the support structure being attached to the highlighted surface 2 by means of the intermediate layer to support that surface during the manufacturing process.

Figure 2:
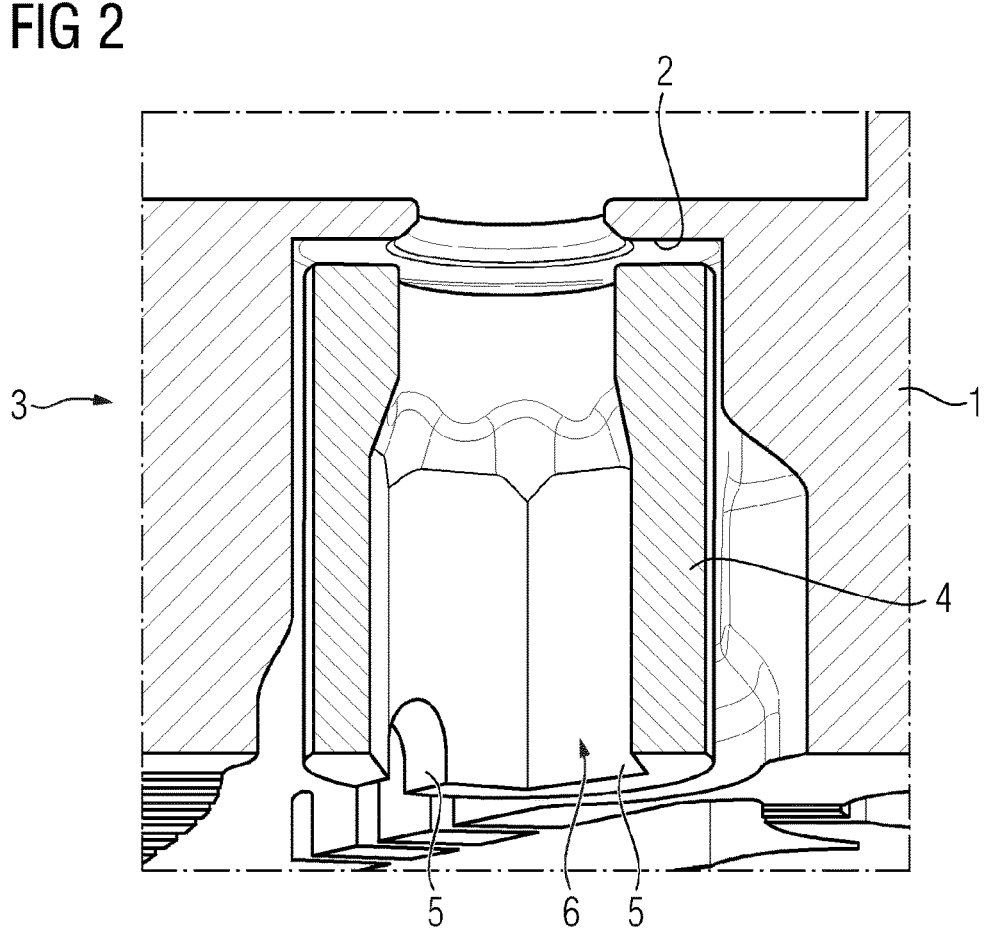
FIG. 2 shows a schematic a cutout of a combination of a cross-section and side view of a supported product.

FIG. 2 shows a schematic a cutout of a combination of a cross-section and side view of a supported product 3. Not shown is the intermediate layer connecting the remaining part of the support structure 4 and the product 1. Both the support structure 4 and the product 1 are manufactured out of metal alloy being a nickel superalloy using selective laser melting.

This supported product 3 as shown in FIG. 2 has been manufactured using 3D printing starting from the bottom of the support structure 4. Herein, the support structure 4 is provided with two interfaces 5 located at the bottom part of the support structure 4. Both interfaces 5 are adapted to interact with a counterpart of the tool for removing the support structure 4. One interfaces 5 is an indentation with a hexagonal opening allowing to insert a hex key and rotate the support structure 4 resulting in it being broken off the product 1. The second interface 5 is realized by means of two indentations on opposite sides of the bottom part of the support structure 3, allowing to insert a slot-head screwdriver like tool into said indentations. This interface 5 also allows to apply rotational forces on the support structure 4 resulting in said support structure 4 breaking off the product 1.

Figure 3:
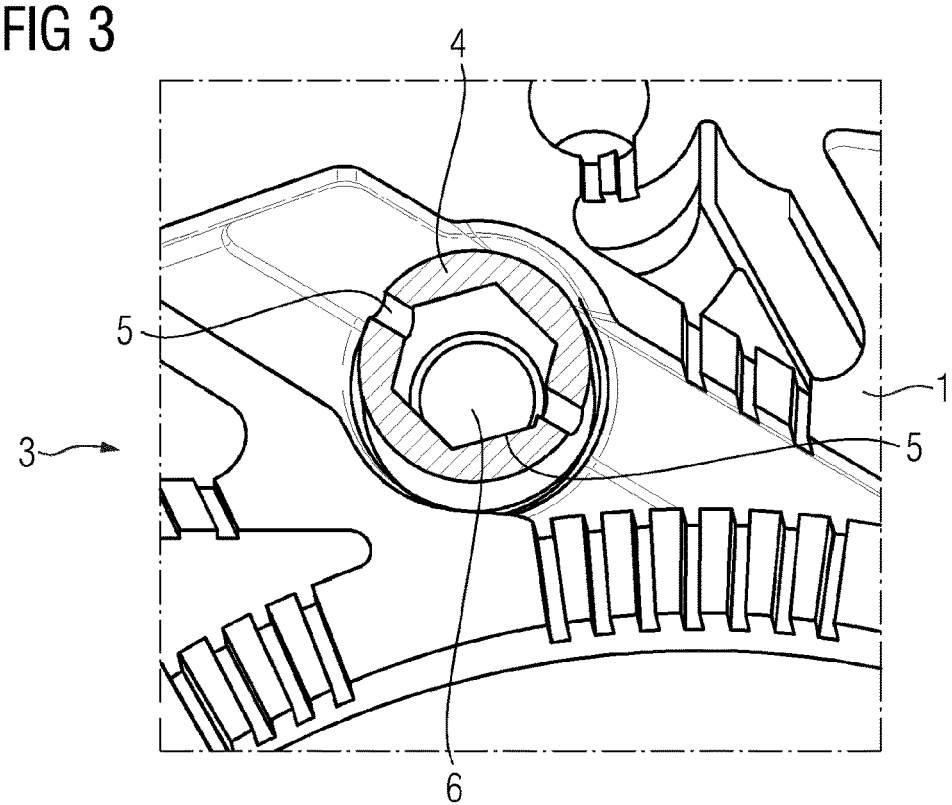
FIG. 3 shows a schematic side view showing the interfaces of the support structure as shown in FIG. 2.

FIG. 3 shows a schematic side view showing the interfaces 5 of the support structure 4 as shown in FIG. 2. Herein, the form of the two interfaces 5 provided to apply rotational force utilizing some tool is more clearly visible. In the middle of the support structure 4 the hexagonal form of the indentation adapted to act as counterpart for a hex key is shown. On the top left and bottom right of the support structure 4 as shown in FIG. 3 the indentations are visible allowing to apply rotational force utilizing some slot-head screwdriver like tool.

Figure 4:
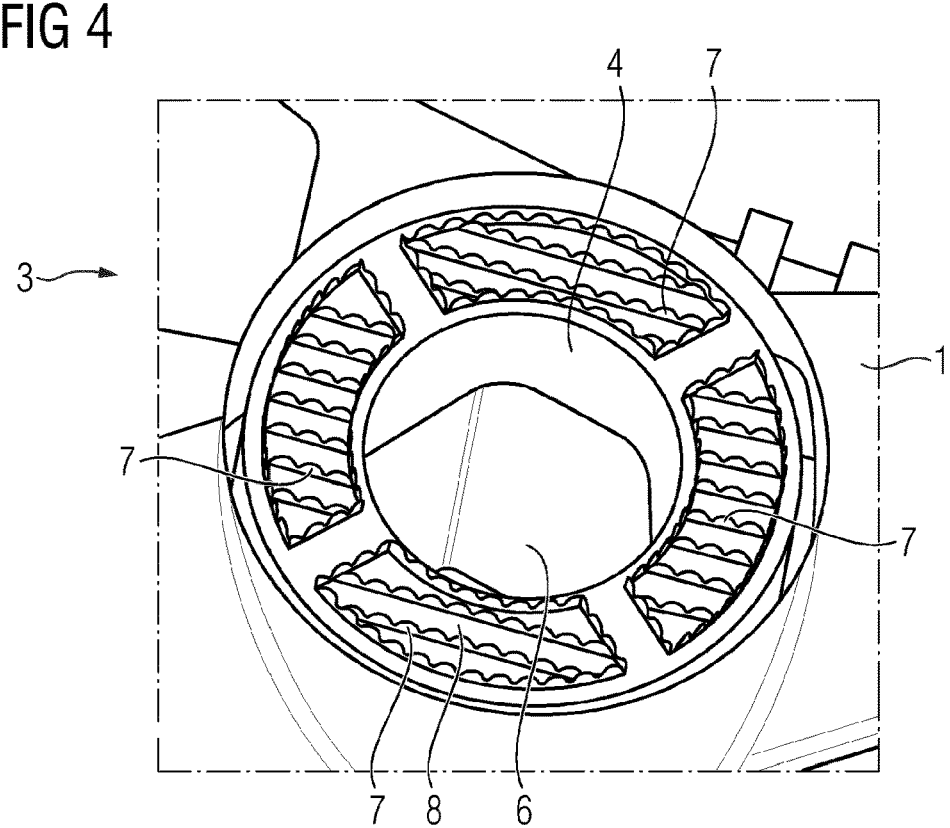
FIG. 4 shows a schematic cross-section through the interface layer support structure as shown in FIGS. 2 and 3.

FIG. 4 shows a schematic cross-section through the interface layer of the support structure 4 as shown in FIGS. 2 and 3. The embodiment as shown in this figure provides segments of the interface 5 distributed evenly over the surface of the product facing the support structure 2. Each segment consists of a number of cavities being Magics™ structures. Although, said Magics™ structures provide openings leading to the outside said intermediate layer 7 typically still contains a certain amount of metal powder from the manufacturing process. However, the intermediate layer 7 consists of a multitude of cavities extending from the remaining part of the support structure 4 to the surface of the product facing the support structure 2. Thus, the plurality of cavities breaks open when removing the support structure 4 setting free the powder that is still contained in such cavities.

While the interface 5 of the support structure 4 is made from solid metal alloy, the intermediate layer 7 consists of the aforementioned Magics™ structure reducing the density of the interface layer to less than 5% of the density of the interface 5. This also results in a mechanical stability of the intermediate layer 7 being far less than the mechanical stability of the interface 5.

Figure 5:
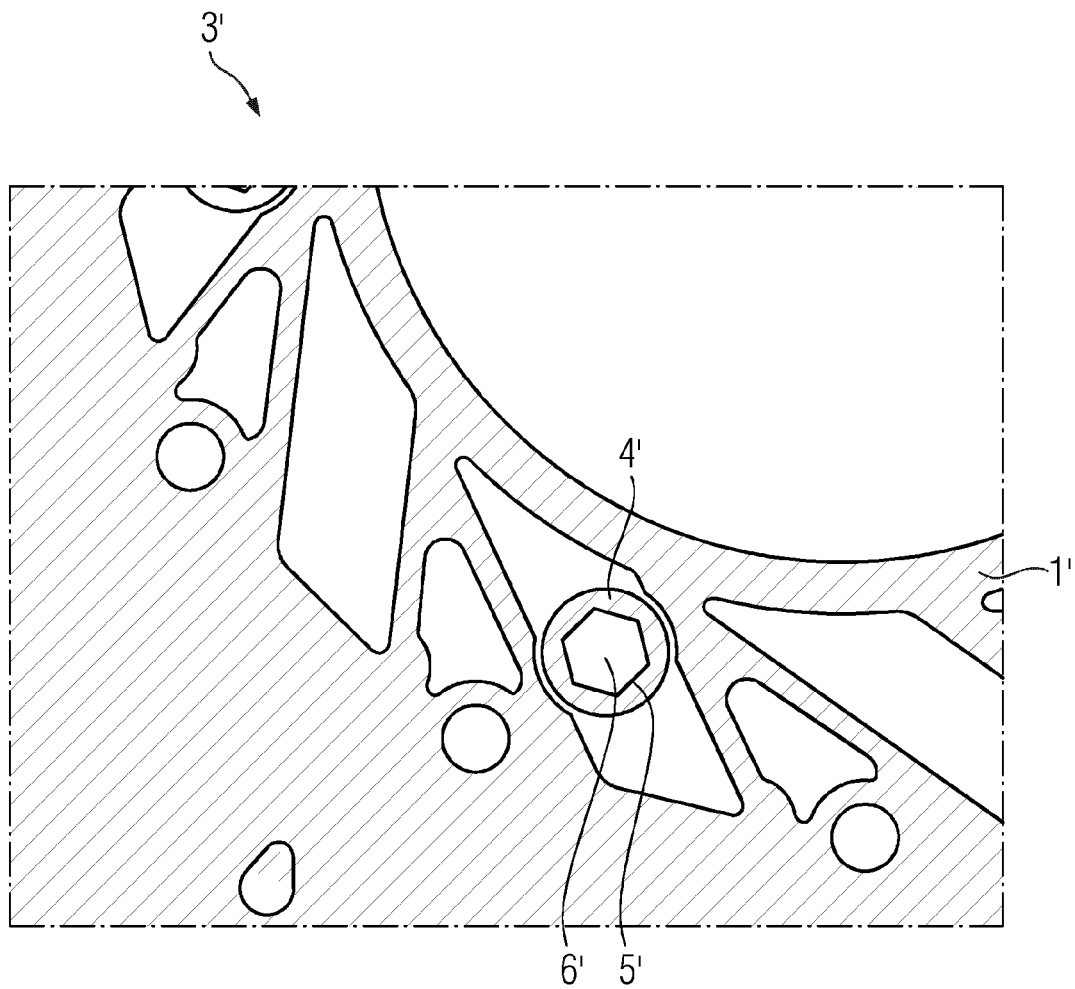
FIG. 5 shows a picture of a different example of the inventive support structure is realized in a support product.

FIG. 5 shows a picture of a different example of the inventive support structure 4' as realized in a supported product 3'. Herein, the support structure 4' provides only one interface 5' being a hexagonal indentation being adapted to act as counterpart to a hex key.

On the top left a part of a second support structure 4' is shown. The inventive support structures 4' are included in the specific design of the corresponding parts and included as required to allow the manufacturing process of the product 1.

Not shown in FIG. 5 is the intermediate layer being contrary to the example as shown in FIGS. 2 to 4 not separated as segments of the intermediate. The example as shown in FIG. 5 provides an intermediate layer that surrounds the central cavity 6' of the support structure 4'. This provides an increased strength of the attachment form of the support structure 4' and allows, for example, to polish the bottom surface of the support product 3' without risking to break off the support structure 4' during such process step. However, the support structure 4' can still be easily broken off by some rotational folders applied utilizing some hex key. Such steps can be performed by some robot arm automatically moving over the surface and breaking of the support structure 4' at the defined locations. However, the force required to break of the inventive support structures 4' as shown in FIG. 5 is low enough to easily break it of by hand, while the security of the corresponding technician is secured as low amount of force required allows safe and secure handling.

Providing embodiments as disclosed in FIG. 5 ensuring to allow further process steps before removing the support structure 4' are especially useful for flexible production methods. Herein, it is not required to program some robot arm to specifically target certain support structure 4' providing different. This typically greatly reduces the speed of the post processing, as especially a flexible change of the tools utilized by the robot arm consumes a significant amount of time. Contrary to that the post processed smooth surface allows the technician to easily identify the support structure 4' by the geometric features provided by the interfaces 5'. As required, it is possible to change the tool like a set of Alan Keyes in different sizes within seconds to remove support structures 4' one after the other. Therefore, it is possible to include a multitude of different support structures 4' with different sizes to support a variety of surface is of the product 1'.

The present invention was only described in further detail for explanatory purposes. However, the invention is not to be understood being limited to these embodiments as they represent embodiments providing additional benefits to solve specific problems or fulfilling specific needs. The scope of the protection should be understood to be only limited by the claims attached.

The invention claimed is:

1. A supported product manufactured using additive manufacturing, comprising:
   a product, and a support structure,
   wherein the supported product has been manufactured using additive manufacturing as a whole,
   wherein the support structure is adapted to be removed to provide the product,
   wherein the support structure provides at least two interfaces, each adapted to interact with a counterpart of a tool for removing the support structure,
   wherein the at least two interfaces are adapted to utilize different tools for removing the support structure;
   an intermediate layer that is connected to a first end of the support structure and to a location on the product;
   wherein the at least two interfaces are adapted to utilize the different tools to break the intermediate layer at the location;
   wherein the at least two interfaces are disposed at a second end of the support structure; and
   information disposed at the second end regarding at least one of a direction to rotate the support structure to break the intermediate layer and an amount of force required to break the intermediate layer.

2. The supported product according to claim 1, wherein the supported product essentially consists of metal or a metal composition.

3. The supported product according to claim 1, wherein the intermediate layer provides a mechanical stability being lower than the mechanical stability of the at least two interfaces.

4. The supported product according to claim 1, wherein the intermediate layer provides a lower density than the at least two interfaces.

5. The supported product according to claim 1, wherein interfaces of the at least two interfaces provide an indentation and/or an outer shape adapted to interact with the counterpart of the tool for removing the support structure.

6. The supported product according to claim 1, wherein the intermediate layer comprises a plurality of segments,
   wherein segments of the plurality of segments each comprise a respective connection, and
   wherein the segments are separated from each other by areas that are free of connection between the product and the support structure.

7. The supported product according to claim 1, wherein the additive manufacturing comprises 3D printing.

8. The supported product according to claim 6, wherein the segments further comprise a respective cavity that comprises powder utilized during the manufacturing of the supported product.

9. The supported product according to claim 6, wherein the segments are evenly distributed within the intermediate layer.

10. The supported product according to claim 1 wherein each interface is configured to receive a rotational force imparted by a respective different tool and is configured to transfer the rotational force through the support structure to the intermediate layer at the location.

11. A method of manufacturing a product, comprising:
manufacturing a supported product according to claim 1 using additive manufacturing, and
removing the support structure from the supported product.

12. A method of supporting a product during an additive manufacturing process, comprising:
supporting the product using the support structure of claim 1,
wherein the support structure is manufactured along with the product during the additive manufacturing process.

* * * * *